G. F. GREEN.
Self Binding Harvester.

No. 236,577

Patented Jan. 11, 1881.

Attest:
N. F. Barnes
L. H. Marshall

Inventor:
George F. Green
By his Atty
R. D. O. Smith

UNITED STATES PATENT OFFICE.

GEORGE F. GREEN, OF KALAMAZOO, MICHIGAN.

SELF-BINDING HARVESTER.

SPECIFICATION forming part of Letters Patent No. 236,577, dated January 11, 1881.

Application filed September 22, 1879.

*To all whom it may concern:*

Be it known that I, GEORGE F. GREEN, of Kalamazoo, in the county of Kalamazoo and State of Michigan, have invented a new and useful Improvement in Self-Binding Harvesters, of which the following is a specification.

The invention relates to a device for moving the grain on a self-binding harvester so that the band shall be in the middle of the bundle whether the straw is long or short; and it consists—

First, in an adjustable guide to be attached to the shoe or butt-board, which is located at the inner end of the cutter-bar, so that the apron or other device that may be used to move the grain along on the lower platform will fetch the butts of the grain against said guide or inclined plane in such a way as to force the grain endwise, and thus prevent the butts from dragging against the elevator-frame. In entering a field, if the grain is found a little short for the binder, this guide may be adjusted so as to shove the grain on the platform a greater or less distance, as may be desired.

Second, in a sliding butt-board controlled by the driver, which on gravelly spots or where the grain has been winter-killed, so that the straw is extremely short, may be used to move the grain endwise by positive motion to the center of the binder.

That others may fully understand my invention, I will particularly describe it, having reference to the accompanying drawings, in which—

Figure 1:
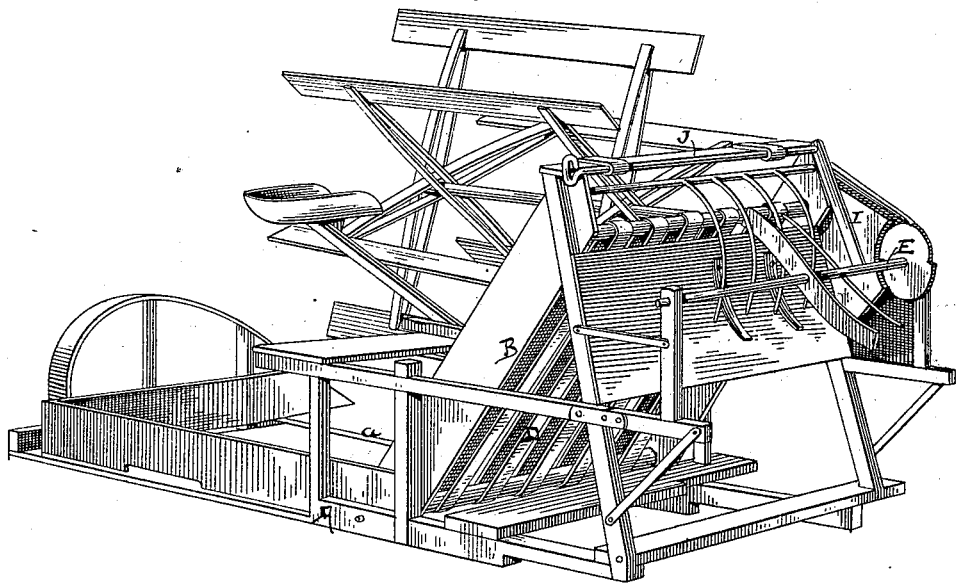
Figure 2:
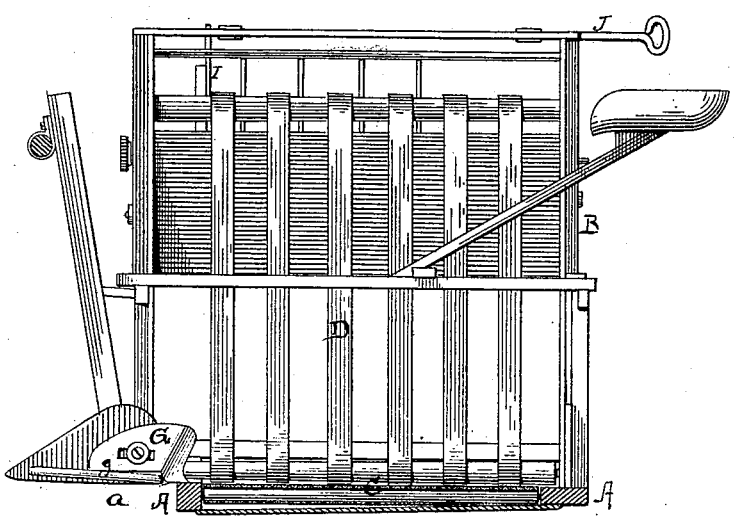
Figure 3:
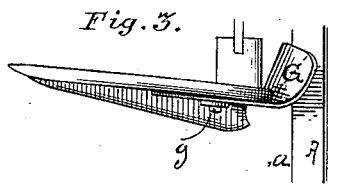

Figure 1 is a perspective view of my machine. Fig. 2 is an elevation of the elevator, showing the adjustable butt-board or guide. Fig. 3 is a detail view of the butt-board.

A is the frame of the machine, upon the inner end of which, surmounting the wheel, is the elevator-frame B. The cutting apparatus is attached to the front edge, *a*, of the main frame, and the cut grain is received upon and carried to the apron *c* and delivered to the elevator belt or belts D. These parts are common on harvesters of this class.

At the rear of the elevator the automatic binding apparatus is placed. In the drawings the binding apparatus is represented by a driving-shaft, E, only, as it does not form an essential part of the invention described herein, which is designed to operate in connection with any stationary binder.

At the foot of the elevator, on its front edge, the adjustable butt-board or guide G is placed, and secured by a clamping-screw, *g*, or other suitable means. As the grain is moved forward toward the elevator the butts encounter the inclined surface of the guide-plate G, and are thereby pushed endwise, or heads foremost, upon the carrier, so as to move the butts farther from the front, and thereby bring the straw with its center of length opposite the binding device.

Under ordinary circumstances the straw may be moved sufficiently in that way to cause the band to be placed around the middle of the bundle; but in nearly every field there will be patches where, from some cause or other, the grain is poorly developed and the straw very short. This may be, for instance, on account of poor or gravelly soil or on account of winter-killing. In such cases the guide G is not of itself sufficient, and I therefore provide a sliding butt-board, I, to which a hand-rod, J, is attached, so that the driver can at any time move said butt-board I and pull a bundle forward to the proper position in the binder. Said sliding butt-board moves with a rectilinear motion, and its parallelism is thereby preserved. It strikes the butts of the grain squarely and moves it all the same distance. It may be arranged to be operated by the foot by means of obvious and well-known contrivances, and its structure and mode of mounting, guides, &c., may be greatly varied. I therefore do not confine myself to the details shown.

Having described my invention, what I claim as new is—

1. A self-binding harvester having an endless apron and elevator to convey the grain to the binder, combined with an adjustable guide-plate, G, one part whereof is substantially parallel with the divider and the other part oblique thereto, so that the butts of the grain being carried by the said apron may strike and slide upon the oblique part of said plate G, and be thereby pushed endwise, for the purpose set forth.

2. A self-binding harvester having an endless apron or belt-elevator to convey the grain to the binder, combined with a sliding buttboard mounted upon and moved by a hand-rod controlled by the driver directly, without intervention of the machinery propelled by the team, for the purpose set forth.

GEORGE F. GREEN.

Witnesses:
FRANK E. KNAPPEN,
DAVID R. CONDEN.